United States Patent [19]
Murakami et al.

[11] 3,876,825
[45] Apr. 8, 1975

[54] FACSIMILE SIGNAL TRANSMISSION APPARATUS

[75] Inventors: Junzo Murakami, Kawasaki; Haruki Yahata, Yokohama; Tadamichi Kawasaki, Kawasaki, all of Japan

[73] Assignee: Tokyo Shibaura Electric Co., Ltd., Kawasaki-shi, Japan

[22] Filed: July 2, 1973

[21] Appl. No.: 375,876

[30] Foreign Application Priority Data

June 30, 1972 Japan ................................ 47-64889

[52] U.S. Cl. ............... 178/6; 178/68; 178/DIG. 3; 178/69.5 f; 325/38 A

[51] Int. Cl. ......................................... H04m 5/04

[58] Field of Search ........ 178/DIG. 3, 68, 6, 69.5 F; 325/38 A

[56] References Cited

UNITED STATES PATENTS 3,506,786 4/1970 Sloate ................................ 179/69.5

3,585,504 6/1971 Mumford et al. .................... 325/30

*Primary Examiner*—Robert L. Richardson
*Assistant Examiner*—Edward L. Coles
*Attorney, Agent, or Firm*—Flynn & Frishauf

[57] ABSTRACT

Facsimile signal transmission apparatus comprising a facsimilie signal generator, a sampling circuit which converts facsimile signals from said generator into digital signals; means including a gate control sampling circuit into three memories in a prescribed sequence and selectively reading out signals stored in the three memories as signals of two channels which are two series of signals shifted only one-half the length of a single scanning line from mutually adjacent two scanning lines and a D-A converter which generates four-level compressed band-width base band signals from the combined signals of aforementioned signals of the two channels.

10 Claims, 56 Drawing Figures

GATE CONTROL CIRCUIT 23

| | | | | | | | | | | | | |
|---|---|---|---|---|---|---|---|---|---|---|---|---|
| SCANNING LINE I | I1 | I2 | I3 | ------- | I499 | I500 | I501 | I502 | ------ | I998 | I999 | I1000 |
| SCANNING LINE II | II1 | II2 | II3 | ------- | II499 | II500 | II501 | II502 | ------ | II998 | II999 | II1000 |
| SCANNING LINE III | III1 | III2 | III3 | ------- | III499 | III500 | III501 | III502 | ------ | III998 | III999 | III1000 |

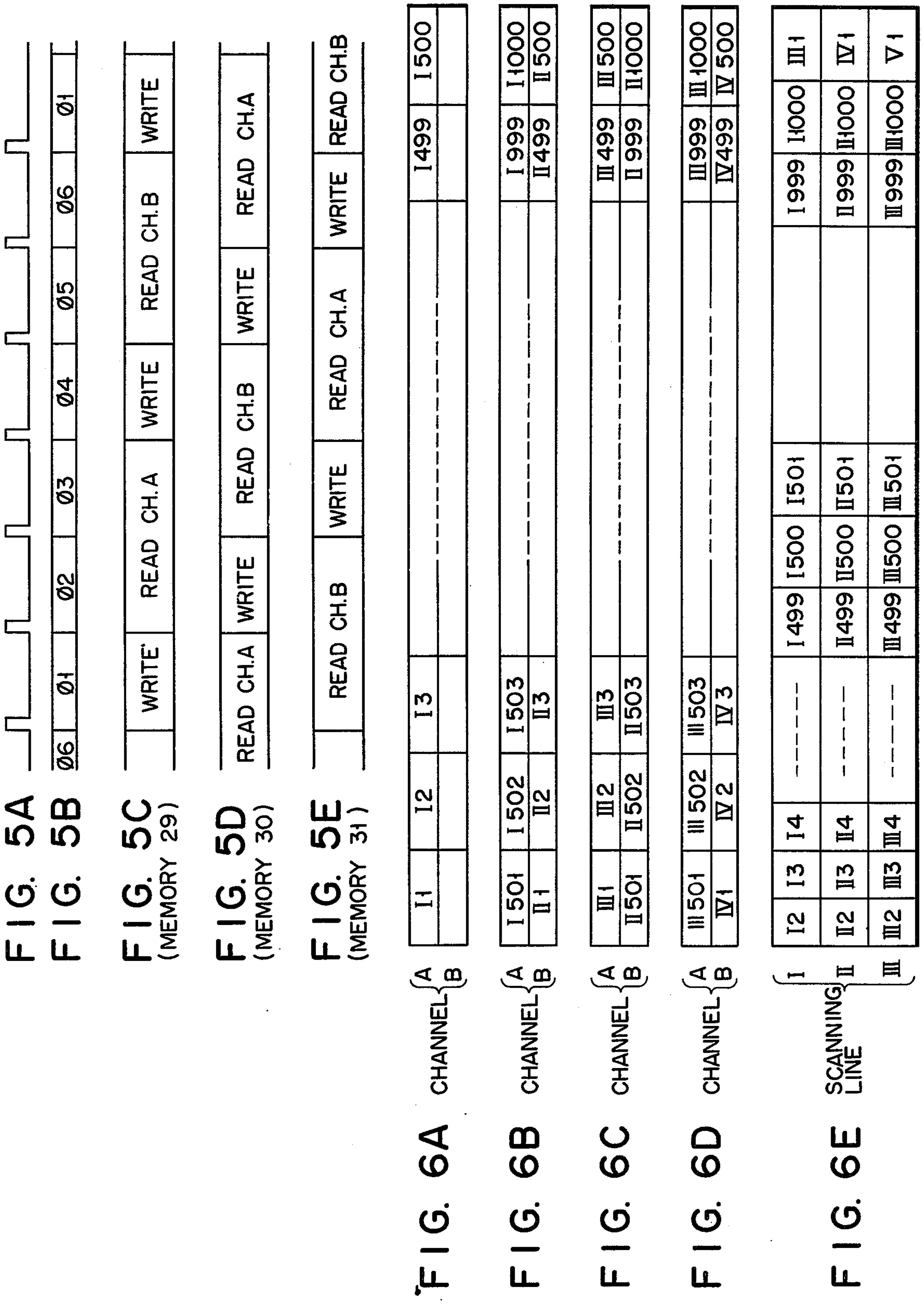
FIG. 5A, FIG. 5B, FIG. 5C (MEMORY 29), FIG. 5D (MEMORY 30), FIG. 5E (MEMORY 31), FIG. 6A, FIG. 6B, FIG. 6C, FIG. 6D, FIG. 6E

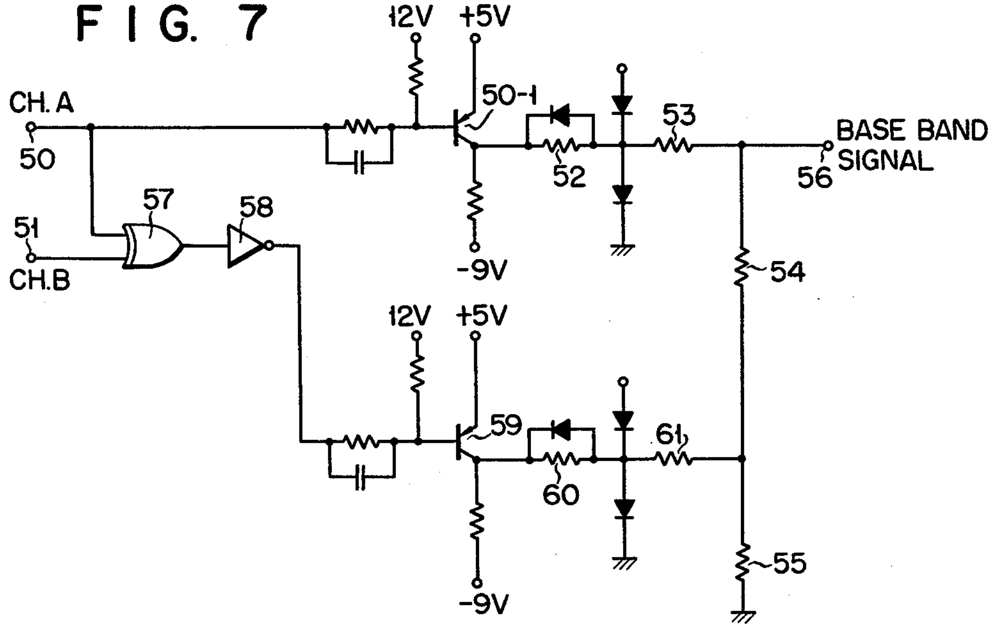
FIG. 7
FIG. 8A A CH.
FIG. 8B B CH.
FIG. 8C
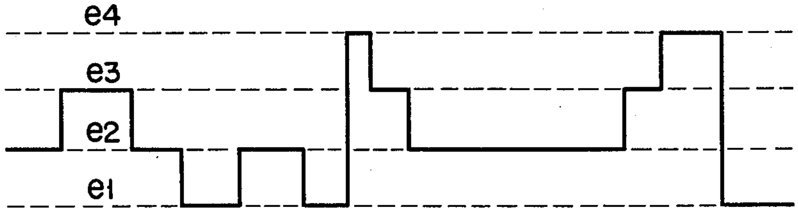
FIG. 8D
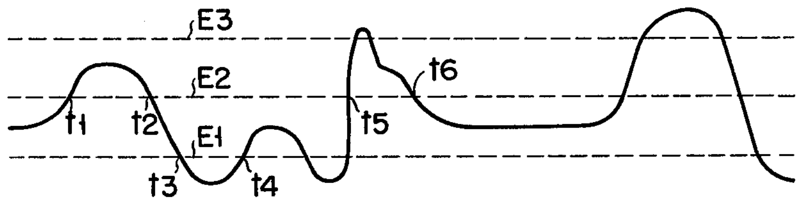
FIG. 8E A CH.
FIG. 8F B CH

FIG. 11A
FIG. 11B
FIG. 11C (MEMORY 91)
FIG. 11D (MEMORY 95)
FIG. 11E (MEMORY 92)
FIG. 12A
FIG. 12B
FIG. 12C
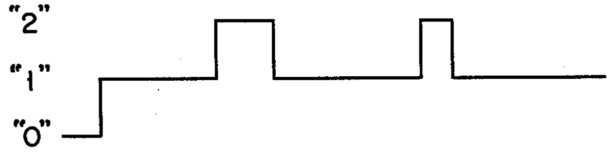
FIG. 12D
FIG. 12E
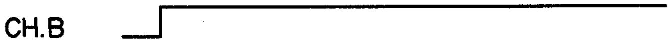
FIG. 12F
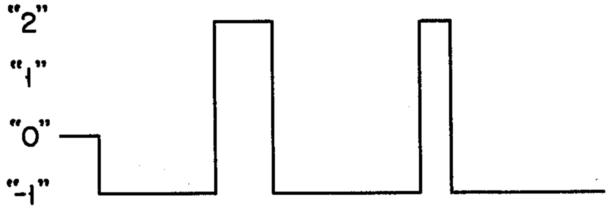
FIG. 12G
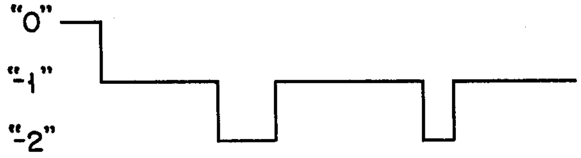

FIG. 14A, FIG. 14B (CH.A), FIG. 14C (CH.B), FIG. 14D (MEMORY 120), FIG. 14E (MEMORY 121), FIG. 14F (MEMORY 122), FIG. 14G (MEMORY 123), FIG. 14H (MEMORY 124), FIG. 14I

FACSIMILE SIGNAL TRANSMISSION APPARATUS

BACKGROUND OF THE INVENTION

This invention relates to an improvement in facsimile signal transmission apparatus in which facsimile signals obtained by scanning the original picture are converted into multi-level signals which are sent, received and reproduced.

In recent years, due to the increase in information quantity to be transmitted, the decrease of the product of required transmission time and required transmission band-width has become an unavoidable and inevitable requirement in transmission of facsimile signals. Digital type and analog type band-width compression transmission methods are known. For this purpose, the analog type band-width compression transmission method is a method for carrying out compression by wave form processing. Despite the fact that deterioration of picture quality must be sanctioned, the method has the advantage that it requires no relatively intricate and expensive equipment, and various types are being put to practical use. However, in either instance, there has been the defect that, in the processes of band-width compression and expansion, misreproduction and extreme deterioration of reproduced picture quality due to loss of synchronization occur and pictures could not be satisfactorily reproduced.

SUMMARY OF THE INVENTION

Thus, the object of this invention is to provide a facsimile signal transmission apparatus which is simple in construction and in which during the process of band-width compression and expansion misreproduction can be minimized and good quality pictures may be obtained even at times of loss of synchronization.

According to this invention, from at least any two mutually adjacent lines of facsimile scanning line information, digital signals of two series which are shifted mutually by one-half the length of a single scanning line, are produced. These two series digital signals are then band-width compressed by multi-level conversion and transmitted, and at the receiving side they are expanded to restore the original state, and rearranged, the interrelation between the digital signals of the two series is small, the misreproduction during the course of band-width compression and expansion is small, also even when loss of synchronization occurs at the receiving side, its effect comes to appear only at the end portions of the picture, and good reproduced pictures are obtained.

BRIEF EXPLANATION OF THE DRAWINGS

FIGS. 5A, 5B, 5C, 5D and 5E are time charts explaining the operation of the system of FIG. 1;

FIGS. 6A, 6B, 6C, 6D and 6E are charts, showing the arrangement of the facsimile signals rearranged by the apparatus of FIG. 1;

FIG. 7 is a circuit construction diagram of a D-A converter of FIG. 1;

FIGS. 8A, 8B and 8C are signal wave-forms for explaining the operation of the circuit of FIG. 7;

FIGS. 8D, 8E and 8F are signal wave-forms for explaining the operation of the circuit of FIG. 10;

FIGS. 11A, 11B, 11C, 11D and 11E are time charts for explaining the operation of the apparatus of FIG. 9;

FIGS. 12A, 12B, 12C, 12D, 12E, 12F and 12G are signal wave-forms for explaining conversion of two-level signals into four-level signals according to the invention;

DETAILED EXPLANATION OF THE EMBODIMENTS

Figure 1:
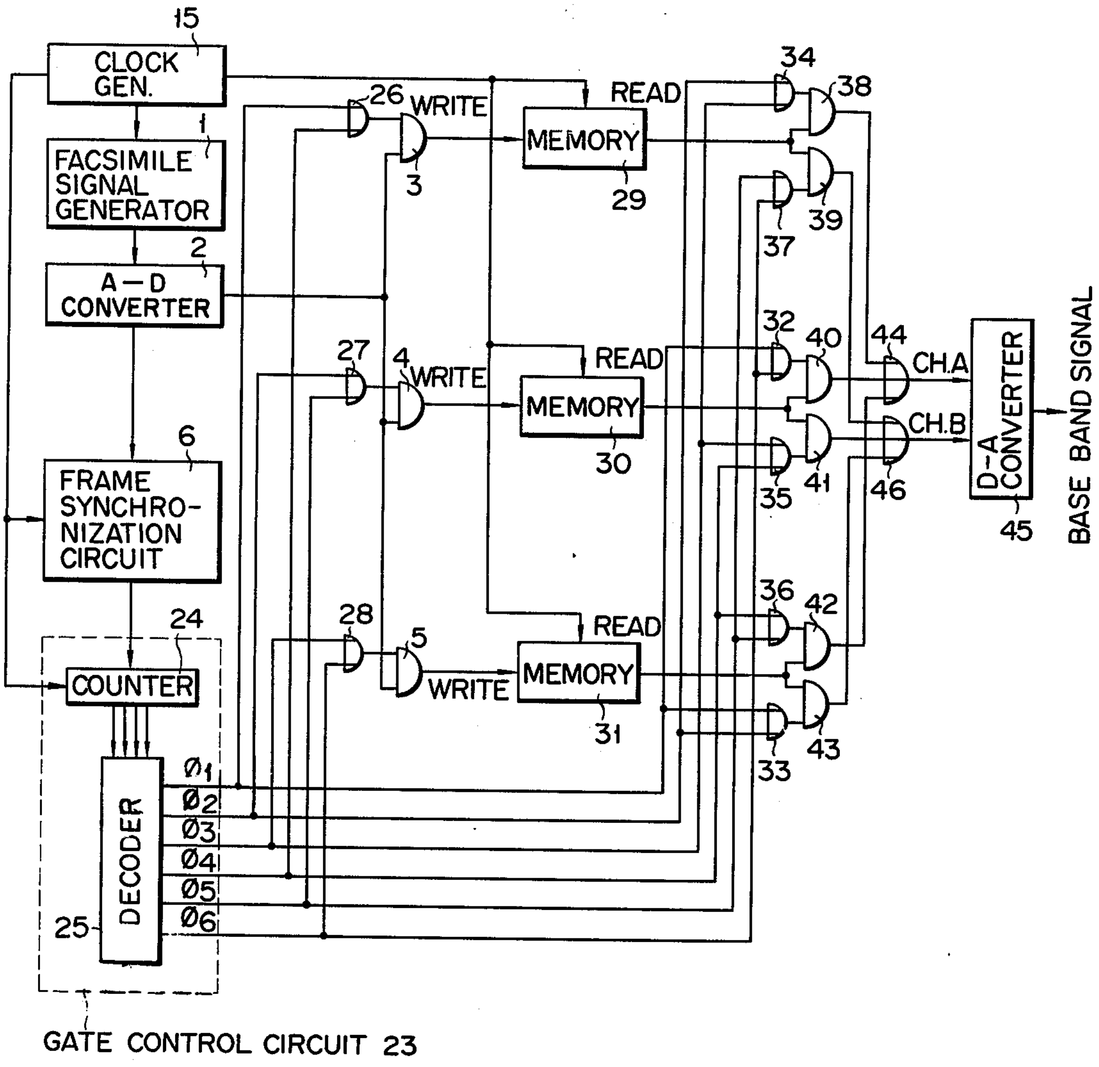
FIG. 1 is a block diagram showing an embodiment of a picture signal transmission system of the facsimile apparatus according to this invention.
Figure 2A:
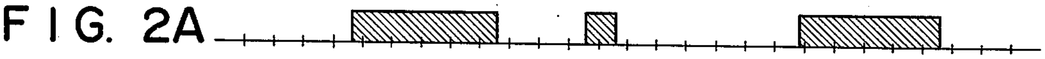
FIGS. 2A and 2B are graphs showing the relation between original signals at a facsimile signal generator of FIG. 1, and binary signals obtained after sampling.
Figure 2B:
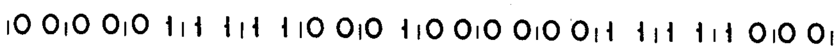

In the picture signal transmission system of the facsimile apparatus shown in FIG. 1, an analog facsimile signal, that is a picture signal generated by a facsimile signal generator 1, is sent to a D-A converter 2, said facsimile signal being, for example, an intermittent signal of constant amplitude as in FIG. 2A quantized by a quantizing circuit (not shown) included in the facsimile signal generator 1. The intermittent analog signal is supplied to the D-A converter 2 from which outputs converted into a series of digital signals having a binary condition as shown in FIG. 2B are obtained.

Figures 3, 4:
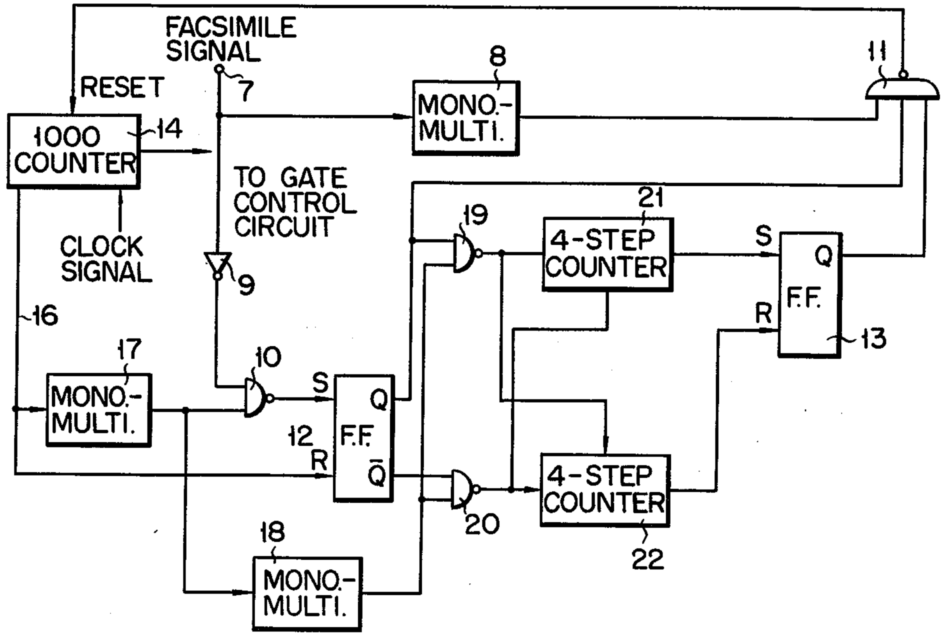
FIG. 3 is a chart form showing the binary facsimile signal system of FIG. 1.
FIG. 4 is a block diagram showing one example of a frame synchronization circuit of FIG. 1.

When a single scanning line I formed by one revolution of a rotating drum of the facsimile signal generator 1 is divided, for example, into 1000 equal parts as shown in FIG. 3, 1000 picture elements I1, I2, I3 . . . I499, I500, I501, I502 . . . I998, I999, I1000 are obtained. Similarly 1000 picture elements II1, II2, II3 . . . II998, II999, II1000 and III1, III2, III3 . . . III998, III999, III1000 are respectively obtained with respect to scanning lines II, III . . . . Scanning lines I, II, III . . . are, in sequence, by way of synchronizing signals, constitute a group of continuous facsimile signals. These facsimile signals are supplied from the D-A converter 2 to inputs of three AND gates 3, 4 and 5, and at the same time to a frame synchronization circuit 6.

The frame synchronization circuit 6 operates to synchronize the operation of the picture signal transmitting system of FIG. 1, with the synchronizing signals included in the facsimile signals and has, for example, the construction as shown in FIG. 4. In FIG. 4, the facsimile signal supplied from the D-A converter 2 of FIG. 1 to an input terminal 7 is fed to a monostable multivibrator 8, and also to an NAND gate 10 through an inverter 9. The monostable multivibrator 8 operates when a black level synchronizing signal of the input facsimile signal, or the picture signal is fed thereto and supplies a pulse output of predetermined width to one input terminal of an NAND gate 11. If synchronization in the frame synchronization system of FIG. 4 is not attained Q outputs of two flip-flops 12, 13 are at high levels, respectively. Thus, the three inputs of NAND gate 11 all become "1" and "0" signals are applied from its output to the reset terminal of a counter 14. The counter 14 is, for example, a counter with a scale of 1000 and when there is a "0" input at the reset terminal, it is arranged so that the count content will be set at 950. Clock signals are fed to counter 14 from a clock generator 15, and counter 14 counts the clock signals sequentially from 950, and its content continues to increase. In this manner, when the content of counter 14 reaches 971 an output appears in an output line 16 and is applied to a monostable multivibrator 8 and to the reset terminal of flip-flop 12. At this instant, Q output of flip-flop 12 maintains a high level. Monostable multivibrator 17 starts to operate when input is applied thereto through line 16 and generates an output having a pulse width slightly narrower than the pulse width of the synchronizing signal contained in the facsimile signal. The output pulse width of multivibrator 17, for example, corresponds to a period of time for counting 60 counts for contents of counter 14 from 971 to 30. Said output is applied to NAND gate 10 and also to a monostable multivibrator 18. At this time, if the synchronizing signal is contained in the facsimile signal, since the output of inverter 9 is negative, the output of NAND gate 10 becomes high level. Since flip-flop 12 is reset by the signal fed from line 16, its state will not be changed by high level signal from NAND gate 10 so that Q output and Q output are maintained at a high and low level, respectively. Monostable multivibrator 18 operates at the fall of the output of monostable multivibrator 17 and generates a pulse of short width which is applied to one of the inputs of the two NAND gates 19 and 20. When the synchronizing signal in the facsimile signal is applied to input terminal 7, the Q output of flip-flop 12 is at low level and Q output is at high level so that at the time monostable multivibrator 18 generates its output, the output of a NAND gate 19 remains at high level, and that the output of NAND gate 20 changes from high to low level (from "1" to "0"), whereby four-step counter 21 is reset and +1 is added to four-step counter 22. At this stage, no carry signal is generated from four-step counter 22 so that the Q output of flip-flop 13 is maintained at high level. When the Q output of flip-flop 13 is at high level as described above, the synchronization of the frame synchronization system is unstable or in a search mode. When four synchronizing signals are supplied to input terminal 7, a carry signal from four-step counter 22 is added to the reset terminal of flip-flop 13 to permit the Q output of flip-flop 13 to be at a low level. This condition is the stable mode of the synchronizing system. In this stable mode, the output of NAND gate 11 is at a high level and "1" output from said gate 11 causes counter 14 to be reset to make the counted content become zero. In the stable mode, the 1000-step counter 14 sequentially counts the clock signal from 1 to 1000, and at each time 1000 is counted, carry signal is applied to counter 24 of the gate control circuit 23 of FIG. 1.

A supply of four synchronizing signals at regular intervals attains the stable mode. When synchronization is shifted, and whereby when counter 22 counts 3, for example, the input of inverter 9 becomes "0", the output of NAND gate 10 becomes "0", the Q output of NAND gate 10 becomes high level, the output of NAND gate 19 goes from "1" to "0" and counter 21 is accordingly caused to become + 1 to reset counter 22, Thus, frame synchronization search operation is again started.

Returning again to FIG. 1, when frame synchronization circuit 6 is in stable mode of synchronized state, for example the output from every 1000 clock signals from clock generator 15 is applied to counter 24 of gate control circuit 23. The counted output of counter 24 is applied to decoder 25. With respect to synchronizing signals from decoder 25 as shown in FIG. 5A, six signals $\phi 1$, $\phi 2$, $\phi 3$, $\phi 4$, $\phi 5$, $\phi 6$ as shown in FIG. 5B are sequentially obtained. Among signals $\phi 1 \ldots \phi 6$, the signals $\phi 1$, $\phi 4$ are applied through OR gate 26 to one of the inputs of AND gate 5. Outputs of AND gates 3, 4 and 5 are respectively connected to write terminals of memories 29, 30 and 31 and responding to outputs $\phi 1 \ldots \phi 6$ of gate control circuit 23, digital facsimile signals are selectively stored in memories 29, 30 and 31.

Further, output $\phi 1$ of gate control circuit 23 is supplied to OR gates 32 and 33, $\phi 2$ to OR gates 33 and 34, $\phi 3$ to 34 and 35, $\phi 4$ to 35 and 36, $\phi 5$ to 36 and 37 and output $\phi 6$ to 32 and 37, respectively. The read terminal of memory 29 is, together with the output of OR gate 34, connected to AND gate 38, and further together with output of OR gate 37 to AND gate 39. The read terminal of memory 30, together with the output of OR gate 32, is connected to AND gate 40, and together with output of OR gate 35, connected to AND gate 41. The read terminal of memory 31 is, together with the output of OR gate 36, connected to AND gate 42, and together with the output of OR gate 33, connected to AND gate 43. The outputs of AND gates 38, 40, and 42 are applied to one of the inputs of a D-A converter 45 as A channel signals from OR gate 44, and outputs of AND gates 39, 41 and 43 are applied from OR gate, as B channel signals, to the other input of the D-A converter 45.

In FIG. 5B, $\phi 1$ signal output when generated from decoder 25 permits AND gate 3 to be opened whereby one scanning line portion of the facsimile signal from A-D converter 2 is stored in memory 29 according to the clock signal from clock generator 15. Further, the $\phi 1$ signal is applied via OR gates 32 and 33 to AND gates 40 and 41 to open the gate thereof with the result that the signals corresponding to the latter half of one scanning line which has been stored in memory 30, for example, the latter half I501 . . . I1000 of scanning line I of FIG. 3, and the front half II1 . . . II500 of scanning line II of FIG. 3, as A channel and B channel signals, are applied from OR gates 44 and 46 to D-A converter 45. Here, during storage in memory 29 of contents of one scanning line portion during one scanning line period, in order to read out from memories 30 and 31 the contents of one-half of one scanning line, it is well to make the frequency of the clock signal one-half that of the clock frequency during the write time. For this purpose, although not shown in the drawings, it is well to utilize as the clock signal for read out purpose, the output obtained by inserting the output of the clock signal into the frequency divider. In this manner, the signals of A channel and B channel read out from memories 30 and 31 are arranged as in FIG. 6B.

Next, when the $\phi 2$ signal is put out from decoder 25, the gate of AND gate 4 is opened as in FIG. 5D, and together with storage of one scanning line of the picture signal in memory 30, from memory 29 for example, the front half of scanning line III, i.e. the elements III1 . . . III500 are read out, further the latter half of scanning line II, i.e. the elements II501 . . . II1000 from memory 31 are read out. In this manner, the A channel and B channel signals read out from memory 29 are arranged as picture elements as in FIG. 6C.

Next, when the $\phi3$ signal is put out from decoder 25, the gate of AND gate 5 opens, as shown in FIG. 5, one scanning line portion of the picture signal is stored in memory 31. On the other hand AND gates 38 and 41 open, and the latter half elements III501 . . . III1000 of scanning line III are read out from memory 30, the front half elements IV1 . . . IV500 of the fourth scanning line IV are read out, to arrange the picture elements as in FIG. 6D.

In this manner, at each time signals $\phi1$ . . . $\phi6$ appear, one scanning line portion is stored in each one of memories 29 . . . 31 and within the same time, from the other two memories, picture elements of one-half of one scanning line are read out. Thus, as apparent from FIGS. 6A . . . 6D, the signals of the front half of one scanning line and the latter half of the adjacent scanning line, or the latter half of one scanning line and the front half of the adjacent scanning line, are combined and applied to D-A converter 45. That is, the information from two adjacent scanning lines is shifted only by one-half the total length of a scanning line, and combined as two channels A and B. As in FIGS. 6A . . . 6D, even if picture elements are rearranged, of course accurate frame synchronization is performed at the leading bit of each scanning line. It is desirable for example, that I1 of FIG. 6A, III1 of FIG. 6C, II1 of FIG. 6B, and IV1 of FIG. 6D be synchronized.

Now it is assumed that frame synchronization is shifted by one bit, and synchronization is attained at positions of bits I2 and III2, II2 and IV2. If picture reproduction is performed under this synchronization condition, frame arrangement is as shown in FIG. 6E. In other words, the picture will be reproduced for scanning line I, as though I2 is at the leading bit, and III1 is at the final bit, for scanning line II, II2 is at the leading bit and IV1 is at the final bit, for scanning line III, from III2 to V1. In this manner, when frame synchronization is delayed by one bit at the sending and receiving sides, the leading bit of another line will be reproduced in the final bit of each scanning line. Inversely, when advanced by one bit, the final bit of another line will be reproduced at the leading side of each line. Similarly, even if frame synchronization is shifted by over two bits, only a few bits of the signals from a different scanning line are placed on the leading or final bit of the reproducing scanning line and other picture signals do not enter in the central portion of the reproduced picture. Therefore, generally even with quite inaccurate frame synchronization, the picture elements of the leading or final portions of the original picture scanning lines do not come to the central portion of the reproduction scanning lines, and the picture quality of the reproduced picture becomes very good.

Returning again to the transmission apparatus of FIG. 1, the information read out selectively from memories 29 . . . 31 is supplied to D-A converter 45 as signals, and at this point the two-level signals are, for example, converted into four-level analog signals. Due to this, the signal band-width of the facsimile signals is compressed, and the transmitted information quantity per unit time can be made to increase. At this time, according to this invention, since the information on adjacent scanning lines is in the state where it is converted into four-levels in the half-line shifted condition, the interrelation between both A and B channels is weak, and misreproduction can be effectively prevented.

Next, referring to FIGS. 8A, 8B and 8C, a concrete embodiment of the D-A converter for four-level conversion will be explained. In FIG. 7, two-level signals from A and B channels are supplied respectively to input terminals 50 and 51. When two-level signals are supplied to said terminals 50 and 51, for example as in FIGS. 8A and 8B, signal *a* level and due to said signal *a*, transistor 50-1 conducts, and electric current flows through resistors 52, 53, 54 and 55. Due to said electric current, voltage of *e*3 level is generated at output terminal 56. On the other hand, signal *a* is applied to one of the input terminals of exclusive OR gate 57, but since the level of the other input terminal is "0", output of gate 57 becomes "1". This "1" output is further sent to inverter 58 of the next stage and becomes a "0" signal. Thus, at this time, transistor 59 is non-conductive.

Next, when signals *c*, *d* exist in A, B channels, each of transistors 50-1 and 59 become ON and at the same time electric current flows from transistor 59 through resistors 52, 53, 54 and 55, it flows from transistor 59 through resistors 60, 61 and 55. Thus, because of voltage drop due to these currents through resistors 54 and 55, a maximum voltage of *e*4 level is obtained at terminal 56. Similarly as follows, a four-level output responding to A, B channel signals is obtained at terminal 56 as so-called facsimile band signals.

Figure 9:
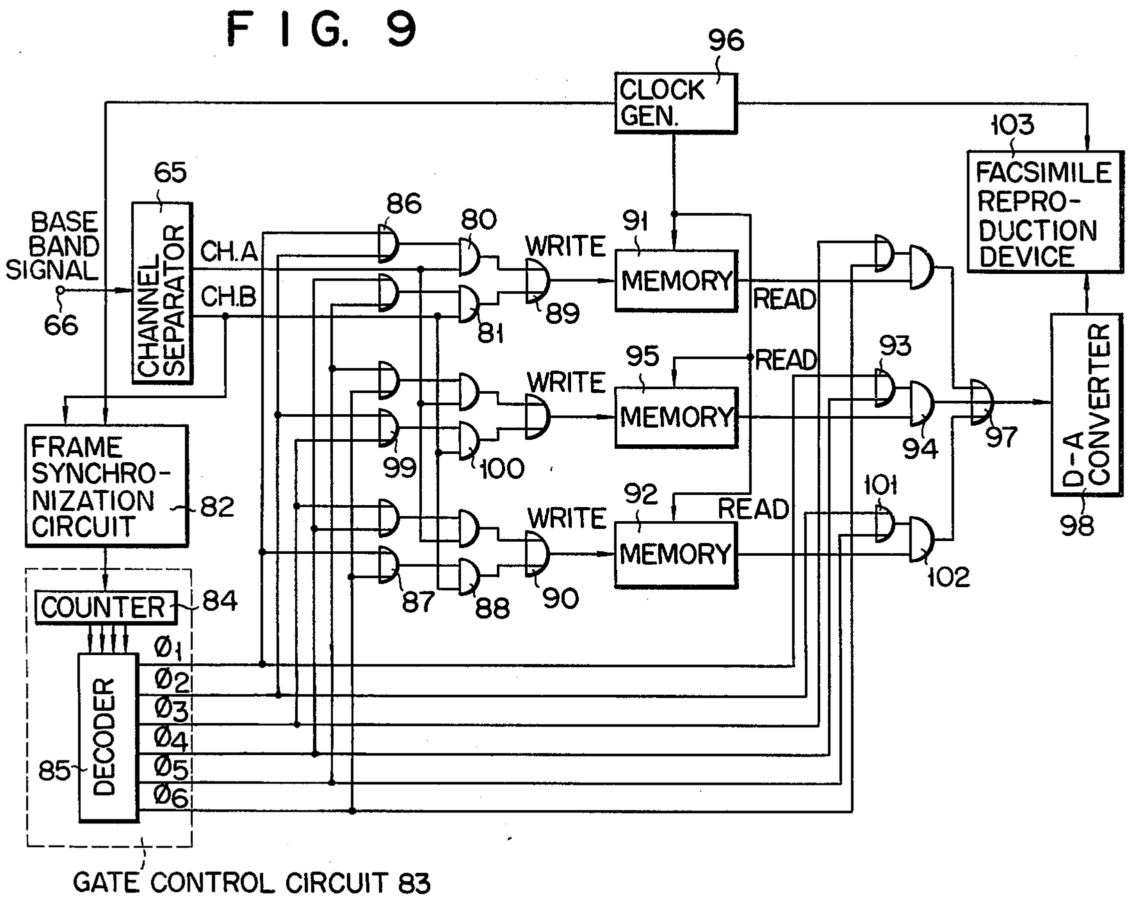
FIG. 9 is a block diagram showing an embodiment of a picture reproducing apparatus used in the facsimile apparatus of this invention.

In this manner, the four-level base band signals produced at the facsimile signal generator of FIG. 1, although not shown in the drawings, are sent through a suitable signal transmission system including a modulation demodulation network to, for example the facsimile signal reproduction device (receiving apparatus) as shown in FIG. 9. In the device of FIG. 9, the transmitted base signals are first applied to terminal 66 of channel separator 65. Said base band signal has its wave form modified, for example, as shown in FIG. 8D by operation of the signal transmission system. In order to take out, from this kind of base band signal, two A, B channel signals corresponding to signals as shown FIGS. 8A and 8B from FIGS. 8E and 8F, an A-D converter or channel separator 65 is employed.

Figure 10:
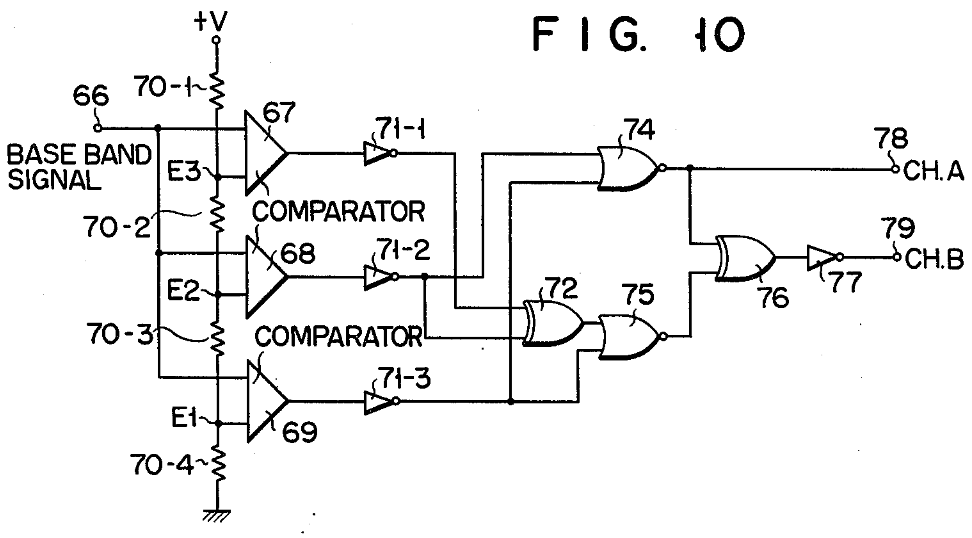
FIG. 10 is a circuit diagram showing a channel separator used in the apparatus of FIG. 9.

FIG. 10 shows an example of channel separator 65 of FIG. 9, the base band signals applied to input terminal 66 are supplied respectively to the input on one side of three comparators 67, 68 and 69. To the other input terminal on the other side, from connecting points on voltage dividing resistors 70, 71, 72 and 73, respectively, voltages E3, E2 and E1 are applied as reference voltages. For example, since the levels of the base band signal inputs at times *t*1, *t*2 are, as shown in FIG. 8D, between reference levels E2 and E3, from the two comparators 68 and 69 "1" output and from comparator 67 "0" output, may be obtained. The "0" output from comparator 67 is inverted to "1" signal at inverter 70 and applied to one side of exclusive OR gate 71. The "1" outputs from comparators 68 and 69 are respectively inverted at inverters 72, 73, the "0" signals are supplied to NOR gates 74, 75 and the other side input terminal of exclusive OR gate 71. Thus, since input of exclusive OR gate 71 becomes "1", "0", input to NOR gate 75 becomes "1", "0" and input to NOR gate 74 becomes "0", "0" and its output becomes "1". Since output of NOR gate 75 becomes "0", input to OR gate 76 becomes "1", "0", output of exclusive gate 77 becomes "0". Thus, at the A channel output terminal 78, as shown in FIG. 8E, signal $a'$ of "1" level is obtained, and at B channel output terminal 79, "0" level output is obtained.

Next, since the level of input base band signal at times $t3$ . . . $t4$ is below reference level E1, at the output of comparator 67 . . . 69 "0" output is given out. Therefore, in this instance, outputs of inverters 70, 72 and 73 respectively are "1". Thus since output of NOR gate 74 is "0", output of inverter 77 becomes "1", and as in FIG. 8F the reproducing signal $b'$ for only channel B is obtained.

Also, at times $t5$, $t6$, the front half of the base band signal is above level E3, and the latter half is between E3 and E2. At said front half portion, outputs of all comparators 67, 68 and 69 are "1", therefore outputs of inverters 70, 72 and 73 become "0". Therefore output of NOR gate 74 is "1", output of inverter 77 also is "1", and as in FIGS. 8E and 8F, at the front half portion at times $t5$, $t6$, "1" signals $c'$, $d'$ are obtained for both channels A, B. At times $t5$, $t6$, for the latter half portion, similarly to times $t1$, $t2$ only the $d'$ signal is reproduced.

Returning to FIG. 9, the A and B channel signals obtained from channel separator 65 are applied to one side of input of AND gates 80, 81 and at the same time, in order to obtain frame synchronization, for example the B channel signal is applied to frame synchronization circuit 82. Said circuit 82, similarly to frame synchronization circuit 6 utilized in FIG. 1, may be constructed for example, utilizing the circuit shown in FIG. 4. From said frame synchronization circuit as shown in FIG. 11A, pulse output synchronized with the frame synchronization signal is sent out to counter 84 of gate control circuit 83. Said gate control circuit 83, similarly to circuit 23 of FIG. 1, is constituted of counter 84 and decoder 85, and whenever input pulse is applied to counter 84, gate control signals $\phi 1$ . . . $\phi 6$ are sequentially given out as output.

In FIG. 11B, first of all when signal $\phi 1$ is given out from decoder 85, said signal $\phi 1$ through OR gates 86 and 87 is applied to AND gates 80 and 88. Due to this, gates of AND gates 80 and 88 are opened, and signals of A and B channels through OR gates 89 and 90 are stored in memories 91 and 92. At this time, the frequency of the clock signals applied to memories 91, 92 is equivalent to the frequency of clock signal utilized when the time memories 20 . . . 31 of FIG. 1 are read out. In memory 91, as shown in FIG. 11C, the front half portion of channel A due to signal $\phi 1$ is stored, and in memory 92 as shown in FIG. 11E the latter half portion of B channel due to signal $\phi 1$ is stored. For example, in memory 91, information corresponding to the front half II1 . . . II500 of scanning line II of FIG. 3, and in memory 92 the latter half I501 . . . I1000 of scanning line I, are stored. Also, the $\phi 1$ signal, through OR gate 73, is applied to AND gate 94, information corresponding to one scanning line portion stored in memory 95 is read out due to clock signals from clock generator 96, and sent from OR gate 97 to D-A converter 98. The frequency of the clock signals obtained from clock generator 96 is established at twice the clock frequency employed at the time of writing relative to memories 91, 92 and 95.

Next, when the $\phi 2$ signal is obtained from decoder 85, this is applied to AND gates 80,100 through OR gates 86, 99, and the signal of channel A is sent to memory 91, and the signal of channel B is sent to memory 95. In memory 91 as shown in FIG. 11C, for example, the latter half II501 . . . II1000 of scanning line II is stored, and as in FIG. 11D, for example the front half III1 . . . III500 of scanning line III, is stored. Also, the $\phi 2$ signal, through OR gate 101, is applied to AND gate 102, and information corresponding to that in one scanning line portion stored in memory 92 is read out and following information from memory 95 is supplied from OR gate 97 to D-A converter 98. Similarly, as follows, information quantity of half portion of one scanning line is written into two memories selected from among memories 91, 92 and 95 due to signals $\phi 3$ . . . $\phi 6$, and at the same time from the balance of memories, information of one scanning line portion is read out and sequentially sent to D-A converter 98. Thus, picture reproduction signals corresponding to scanning lines I, II and III of the sending side as in FIG. 3 are obtained at D-A converter 98, these are sent to facsimile reproduction device 103, and a facsimile picture corresponding to the original picture is obtained.

In the above-mentioned embodiment, the two signals sent out simultaneously in parallel by channel A and channel B are signals where adjacent scanning lines are mutually shifted by one-half cycle, and under the circumstance where one is a black level frame synchronizing signal, the other is the picture signal. For example, as in FIGS. 12A and 12B, under the circumstance where channel A is the frame synchronizing signal and channel B is the information signal, the level of the output signal of D-A converter 45, as shown in FIG. 12C, only goes back and forth between "1" level and "2" level, but when frame synchronizing signals are present, the four-level output of converter 45, as in FIG. 12F, goes back and forth between "−1" level and "2" level. Therefore, in this case, since "1" level is passed through and, for example moves from "−1" to "2" level, there is a fear of wrong level being put out. In order to solve this, as shown in FIG. 12G, the "−2" level is added, and arranged to make five-level signals, and even at "−2" level both channels A and B are made to appear at the black level. In this case, the output of "1" level is moved to "2" level and output of "−1" level is moved to "−2" level. Furthermore, without five-level conversion in this manner, if frame synchronization signals only are first sent and synchronization is established, and subsequently frame synchronization portion is made to be at white level, it is possible to prevent misreproduction even with four-level signals.

In the foregoing embodiment, two channel signals representing the different half portions of a single scanning line are produced from information obtained by any two adjacent scanning lines. The two channel signals are combined into a single signal having four levels so as to transmit a band-compressed picture signal. Further according to this invention, it is possible to give forth two channel signals representing the different half portions of a single scanning line from information obtained by any two alternate scanning lines. Even this arrangement can attain the same effect. In this case, interaction between two channel signals is more reduced than between those produced from information derived from any two adjacent scanning lines, attaining a better reproduction of a facsimile picture image.

Figure 13:
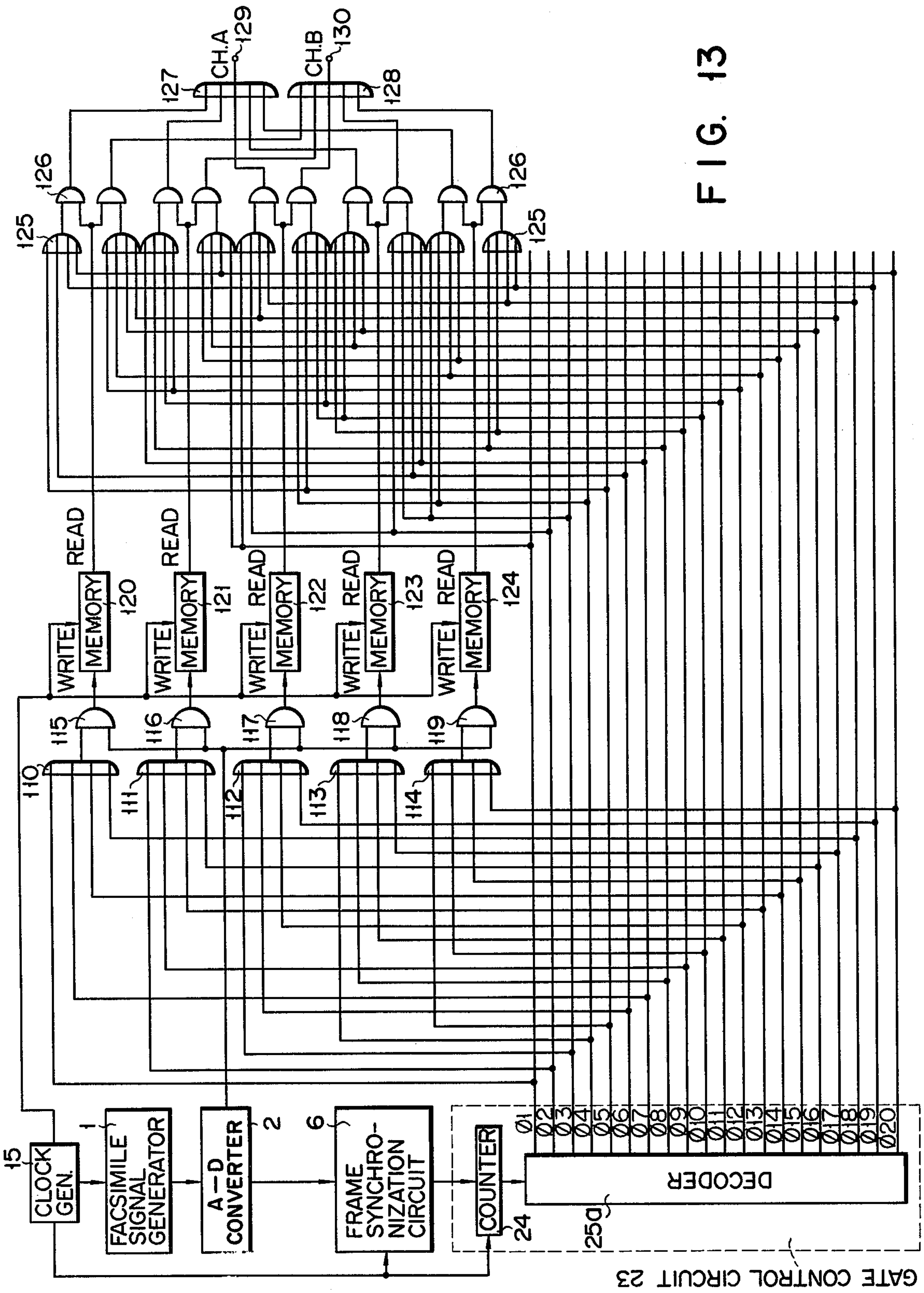
FIG. 13 is a block diagram showing another embodiment of this invention.
Figure 14:
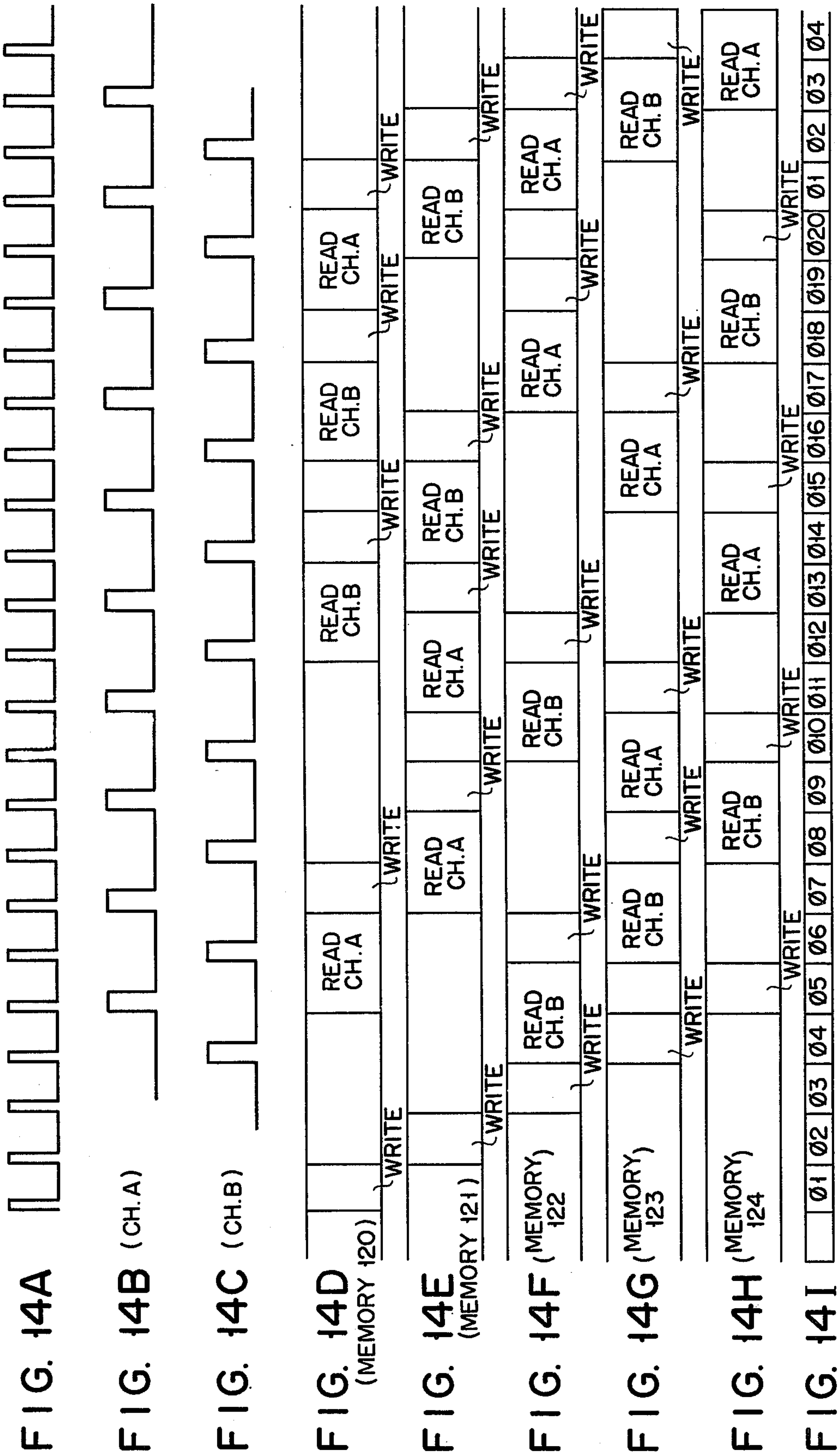
FIGS. 14A to 14I are time charts for explaining the operation of the apparatus of FIG. 13.

There will now be described by reference to FIGS. 13, 14, 15 and 16 the embodiment of the above-mentioned case. Throughout the following description, the parts the same as those of FIGS. 1 and 9 are denoted by the same numerals. Referring to FIG. 13, the decoder 25*a* of the gate control circuit 73 generates gate control signals φ1 to φ20 of FIG. 14I upon receipt of a synchronizing signal of FIG. 14A. Successive delivery of the gate control signals φ1 to φ20 causes the AND gates 115, 116, 117, 118 and 119 to be opened in turn through the NAND gates 110, 111, 112, 113 and 114 respectively. Digital facsimile signals from the A-D converter 2 are stored for each scanning line. Upon receipt of, for example, gate control signals φ1 to φ5, the memories 120 to 124 are successively stored with picture signals as shown in FIG. 14D to FIG. 14H. The gate control signals φ1 to φ20 are conducted to 10 AND gates 126 through 10 OR gates 125 so as to open said gates. The gate control signals φ1 to φ20 cause picture signals representing the half portions of information obtained by the respective scanning lines which are already stored in the memories 120 to 124 to be read out and conducted to the output terminals 129 and 130 through the OR gates 127 and 128 so as to provide the signals of the A and B channels. For example, the gate control signal φ5 causes picture elements I501 to I1000 of FIG. 3 constituting the rear half portion of information obtained by the scanning line I to be read out from the memory 122 and also picture elements III1 to III500 constituting the former half portion of information obtained by the scanning line III to be read out from the memory 120. The signals of these picture elements are converted to signals having four levels by the D-A converter the same as the converter 45 of FIG. 1, so as to form the signals of the A and B channels.

According to the embodiment of FIGS. 13 to 16, there are produced from information obtained by two alternate scanning lines two channel signals representing the different half portions of a single scanning line and combined to have four levels.

Figure 15:
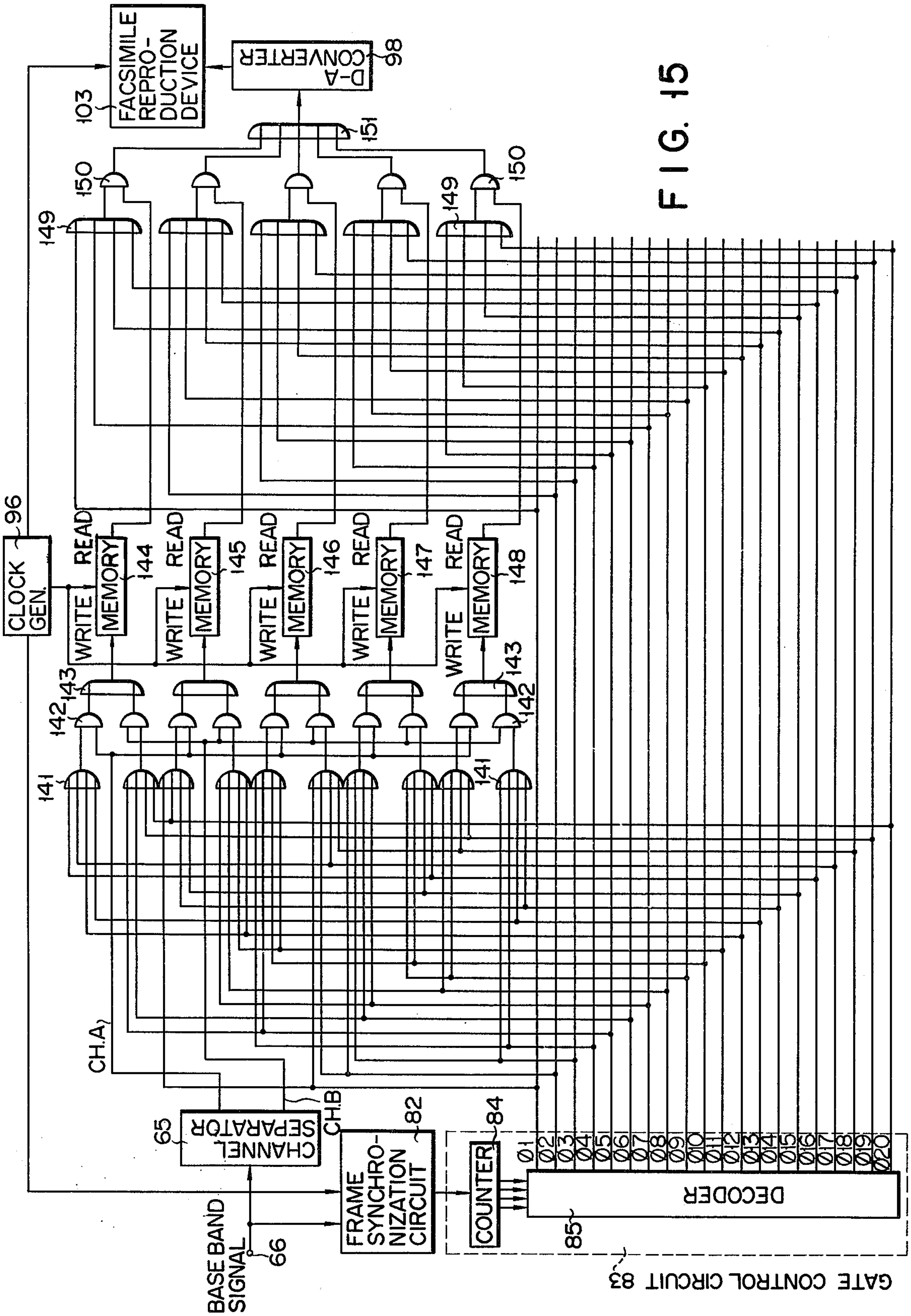
FIG. 15 is a block diagram showing an embodiment of a receiving apparatus for reproducing pictures from facsimile signals produced by the apparatus of FIG. 13.
Figures 16A, 16B, 16C, 16D, 16E, 16F, 16G, 16H, 16I:
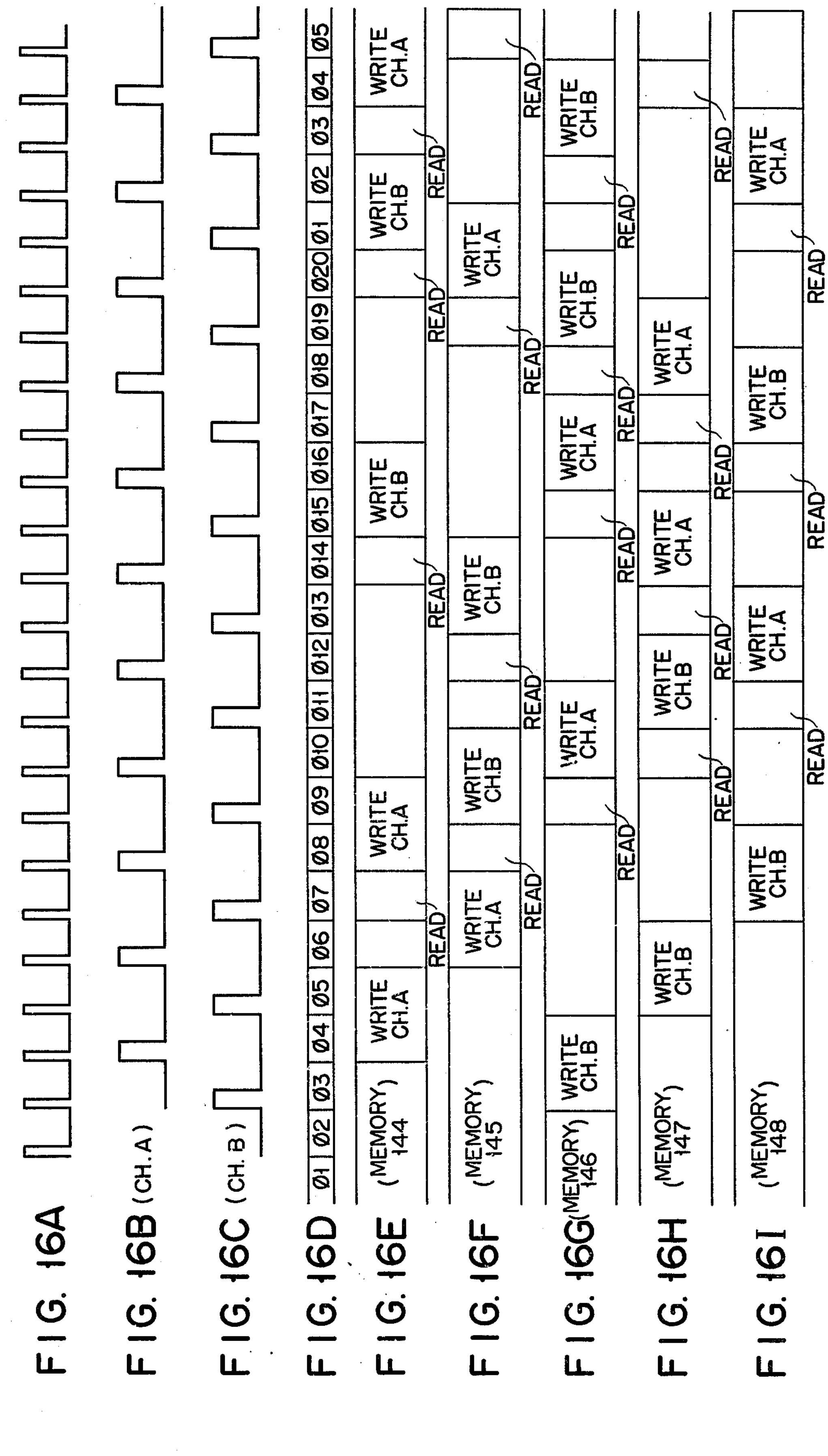
FIGS. 16A to 16I are time charts for explaining the operation of the apparatus of FIG. 15.

The signals of the A and B channels delivered from the output terminals 129 and 130 of FIG. 13 are converted to base band signals of four levels through a D-A converter the same as the D-A converter 45 of FIG. 1 so as to be transmitted to the receiving apparatus of FIG. 15. Referring to FIG. 15, the base band signals brought to the input terminal 66 are separated into those representing the channel A and those representing the channel B by the channel separator 65. The signals of the A and B channels thus separated are selectively stored in the memories 144 to 148 through 10 OR gates 141, 10 AND gates 142 and five OR gates 143 under control of the gate control signals φ1 to φ20 delivered from the decoder 85. As in the foregoing embodiment, clock pulse signals used in this case have a frequency equal to half that of clock pulse signals generated by the clock pulse generator 96 used in reading out information. The full storage of information obtained by a single scanning line in one memory takes a sufficient time to generate two gate control signals.

The gate control signals φ1 to φ20 are also conducted to five AND gates 150 through five OR gates 149. Accordingly, items of information obtained by the respective scanning lines and stored in the memories 144 to 148 are read out to the D-A converter 98 from the AND gates 150 through the OR gates 151 in the prescribed sequence. Upon receipt of, for example, the gate control signals φ7 to φ11, items of information (FIGS. 16E to 16I) obtained by five scanning lines are read out from the memories 144 to 148.

What we claim is:

1. Facsimile signal transmission apparatus comprising:

a generator generating facsimile signals including frame synchronization signals, an A-D converter including a sampling circuit which converts facsimile signals obtained from said facsimile signal generator into a digital series which indicates a prescribed number of picture elements, a means for taking out from said sampling circuit simultaneously as two channel signals first and second series of signals mutually shifted only by a half-length portion of one scanning line from any two lines at least mutually adjacent of scanning line information, and a D-A converter for obtaining an analog base band signal by combining the two channel digital signals obtained from said taking out means.

2. Apparatus according to claim 1 which further comprises a frame synchronization circuit for synchronizing said frame synchronization signals with the functioning of the facsimile signal transmission apparatus.

3. Apparatus according to claim 2 wherein said frame synchronization circuit includes a first flip-flop which detects frame synchronizing signals in said facsimile signals and gives out outputs, a first counter which gives out output when outputs from said first flip-flop are continuously counted by a prescribed number of counts and a second counter which sends a carry signal to said take-out means when there is output from said first counter and it is reset and the prescribed number of clock signals have been counted.

4. Apparatus according to claim 1 wherein said means for taking out two channel signals includes a gate control circuit which, corresponding to the aforementioned frame synchronization signals, sequentially generates a plurality of gate control signals; a first logic gate circuit which is gate controlled by said gate control signals; a memory device which under control of said logic gate circuit sequentially stores one line portion of a scanning line from the output of said sampling circuit; and a second logic gate circuit controlled by said gate control signals, from the information of at least two mutually adjacent scanning lines stored in said memory device, for simultaneously taking out, as two channel signals, two series of signals containing an information quantity each corresponding to one-half portion of a scanning line and mutually shifted by one-half length of one scanning line.

5. Apparatus according to claim 4 wherein said gate control circuit comprises means to generate first through sixth inclusive gate control signals, the aforementioned first logic gate circuit having first to third OR gates selectively applied said first to sixth gate control signals and first to third AND gates, outputs of said OR gates being applied to input terminal of one side of each thereof, and to the input terminals of the other side the outputs of the D-A converter being applied; the aforementioned memory device being comprised of first to third memories which receive outputs from said first to third AND gates; and the aforementioned second logic gate circuit is comprised of fourth to ninth OR gates to which signals of the aforementioned first to sixth gate controls are selectively applied; fourth to ninth AND gates in which outputs of said OR gates are applied to input terminal of one side, and to input terminals of the other side outputs of the aforementioned first to third memories are applied; and tenth and eleventh OR gates which put out, as signals of the aforementioned two channels, selectively applied outputs of fourth to ninth AND gates.

6. Apparatus according to claim 4 wherein said gate control circuit is constructed so that it will put out first through 20th gate control signals, said first logic gate circuit includes first to fifth OR gates to which are applied selectively the aforementioned first to 20th gate control signals; first to fifth AND gates to which the output from said OR gate is applied to input terminals of one side, and the output of the D-A converter is applied to input terminals of the other side; the aforementioned memory device is comprised of first to fifth memories receiving outputs of the first to fifth AND gates; the second logic gate circuit is comprised of sixth to tenth OR gates to which signals of the aforementioned first to 20th gates are selectively applied; sixth to 15th AND gates to which outputs of said OR gates are applied to input terminals on one side, and to the input terminal on the other side are applied outputs of aforementioned first to fifth memories; and 11th and 12th OR gates to which are applied in common the outputs of said sixth to 15th AND gates.

7. Apparatus according to claim 1 wherein said D-A converter is comprised of a first switching circuit to which is applied the aforementioned first channel signal; an exclusive OR gate to the two input terminals to which are applied signals of the two aforementioned first and second channel signals; an inverter which inverts the output of said exclusive OR gate; a transistor switching circuit to which is applied output of said inverter; and a resistor circuit where, according to the conductive condition of the aforementioned first and second switching circuits, the output voltage is determined.

8. Apparatus according to claim 1 which further comprises a channel separator which receives the aforementioned base band signals and expands the band-width and separates the two channel signal series; a second gate control which, corresponding to the aforementioned frame synchronization signals, generates sequentially a plurality of gate control signals; a first logic gate circuit which is gate controlled by said gate signal; a memory device which under control of said first logic gate circuit sequentially stores scanning lines, one line at a time, from the output of the aforementioned channel separator; a second logic gate circuit controlled by the aforementioned gate control signals in which scanning line information stored in said memory device is read out in prescribed sequence and for compounding a group of digital facsimile signals; a D-A converter for reproducing analog facsimile signals from the aforementioned digital signals; and a facsimile reproduction device, responding to output of said D-A converter and reproducing the picture.

9. Apparatus according to claim 8 wherein said second gate control circuit is constructed to put out first to 20th gate control signals, the aforementioned first logic gate circuit includes first to 10th OR gates to which are applied selectively aforementioned first to twentieth gate control signals; the first to tenth gates where outputs of said OR gates are applied to input terminals on one side, and to the input terminals on the other side are applied to outputs from the aforementioned channel separator; and 11th to 15th OR gates to which are applied the outputs of said AND gates; the aforementioned memory devices are comprised of first to fifth memories which store outputs from 11th to 15th OR gates; the aforementioned second logic gate circuit is comprised of 16th to 20th OR gates which receive first to 20th gate control signals from the aforementioned fourth logic gate circuit, eleventh to 15th AND gates which pass scanning line information from said first to fifth memories when the gate is opened due to output of said OR gate, and a 21st OR gate to which outputs of said AND gates are commonly supplied.

10. Apparatus according to claim 8 wherein said channel separator is comprised of a plurality of comparators to which the aforementioned base band signals are applied respectively to one side of the input, and to the other side are applied reference signals; and a further logic gate circuit which combines the outputs of said comparators and generates said signal of two channels.

* * * * *